Fig.1

June 1, 1937. J. D. WALKER 2,082,759
METHOD AND APPARATUS FOR TREATMENT OF SEWAGE
Filed Oct. 15, 1934 5 Sheets-Sheet 2

Inventor: James Donald Walker

June 1, 1937.  J. D. WALKER  2,082,759
METHOD AND APPARATUS FOR TREATMENT OF SEWAGE
Filed Oct. 15, 1934  5 Sheets-Sheet 3

Inventor:
James Donald Walker.
By
Attys.

June 1, 1937.  J. D. WALKER  2,082,759

METHOD AND APPARATUS FOR TREATMENT OF SEWAGE

Filed Oct. 15, 1934  5 Sheets-Sheet 4

Inventor:
James Donald Walker.
By Brown Jackson Boettcher Dienner
Attys.

Patented June 1, 1937

2,082,759

UNITED STATES PATENT OFFICE 2,082,759

METHOD AND APPARATUS FOR TREAT-
MENT OF SEWAGE

James Donald Walker, Aurora, Ill., assignor, by
mesne assignments, to The American Well
Works, Aurora, Ill., a corporation of Illinois Application October 15, 1934, Serial No. 748,284

23 Claims. (Cl. 210—8)

This invention relates to a method and apparatus for treating sewage, and is more particularly directed to a method of aerating sewage in an aeration tank and the apparatus for carrying out this method.

In the treatment of sewage, the present tendency is to employ what has been termed the "activated sludge process", one step in the treatment of which comprises the purification of sewage by the conversion of the putrescent and putrescible, and perhaps other more or less complex nitrogenous, carbonaceous and sulphurous compounds into simpler compounds which are wholesome and inoffensive. This action involves ultimately the oxidation of these compounds. When all, or substantially all of the total nitrogen has been reduced to nitrates and nitrites, a sufficiently complete purification has been effected. This oxidation is effected by the activity of aerobic bacteria upon contact with the sewage, the intermediate nitrogenous compounds being reduced by this process to the simpler nitrates and nitrites.

The activated sludge system, in its broader aspects, contemplates running sewage into a tank and there mixing it with a quantity of "activated sludge" which is a mixture of many species of aerobic bacteria suspended in water. The bacteria adhere to the surfaces or pores of minute particles or flocs of zoogleol or gelatinous material. The flocculi are suspended in the water and, with it, form a liquid that flows like water. This liquid, or sludge, may thus be described as a uniform, flocculent suspension of the sewage solids accumulated from the suspended and colloidal solids present in sewage under aerobic conditions, and is rich in aerobic organisms.

These organisms, however, are active only in the presence of air, and the problem has consequently been one of providing means for incorporating air into the liquid in the aeration tank to allow these organisms to purify the sewage. In some of the earlier patents issued to Walter Jones, such as Patent No. 1,247,540, issued October 19, 1914, a process for supplying air to the liquid during local upflow in the tank is clearly described. Other apparatus known to the art, and with which I am familiar, provides for surface agitation of the liquor, by means of beaters, paddles or the like, or provides for introducing compressed air through pipes at the bottom of the tank and allowing it to bubble upwardly through the liquor.

The present invention, in its preferred embodiment, is directed to a method of treating sewage which comprises drawing surface liquor in the tank downwardly through a restricted portion of the tank, incorporating minute air particles into the liquor as it begins its downward flow, and distributing said air particles throughout the tank volume as they rise through the liquor.

A particular feature of the present invention is that the surface liquor is withdrawn from outwardly spaced areas and conducted through a central passageway extending downwardly in the tank without disturbing or agitating the surface of the liquor in the tank. This is desirable, in that it does not disturb the flocs of activated sludge, and further, does not produce splashing, which, during cold weather, is undesirable for obvious reasons.

A further object of the present invention is the provision of means for incorporating minute particles of air into the liquor which is drawn from the surface of the aerated tank, and controlling the quantity of air particles so incorporated in accordance with the amount of aeration desired in the tank. By the provision of a novel type of aerating apparatus, I have been able to provide adjustable means for controlling the quantity of surface liquor withdrawn, and also providing for the withdrawal of this liquor from adjacent the corners of the tank so as to effect a circulation of all of the liquor in the tank. This distributed circulation prevents short circuiting of the cycle of flow of the liquor in the tank, as will be brought out in more detail hereinafter.

A further advantage of the present invention resides in the manner of supporting the driving means for the aerating apparatus with respect to the aeration tank. Provision is made for equalizing the stresses imposed upon the mounting members of the driving means whereby expansion and contraction caused by temperature changes in the tank structure will not affect the alinement of the driving means.

Other objects and advantages of the present invention will appear more fully from the following detailed description, which, taken in connection with the accompanying drawings, will disclose to those skilled in the art the particular construction and operation of a preferred form of my invention.

Referring now in detail to the drawings, the aerating tank comprises a substantially rectangular tank portion 5, having end walls 6, and provided with a longitudinally extending bridge portion 7. The tank 5 is preferably formed of concrete, or a similar material, and has its side wall surfaces tapered inwardly, as shown at 8, to a centrally extending flat surface 9 forming the bottom of the tank.

The tank 5 may be either square, or may comprise a series of tanks extending end to end, and optionally provided with separating partition members 10, having openings for passage of liquor from one tank to another, although these members may be eliminated, if desired.

Figure 2:
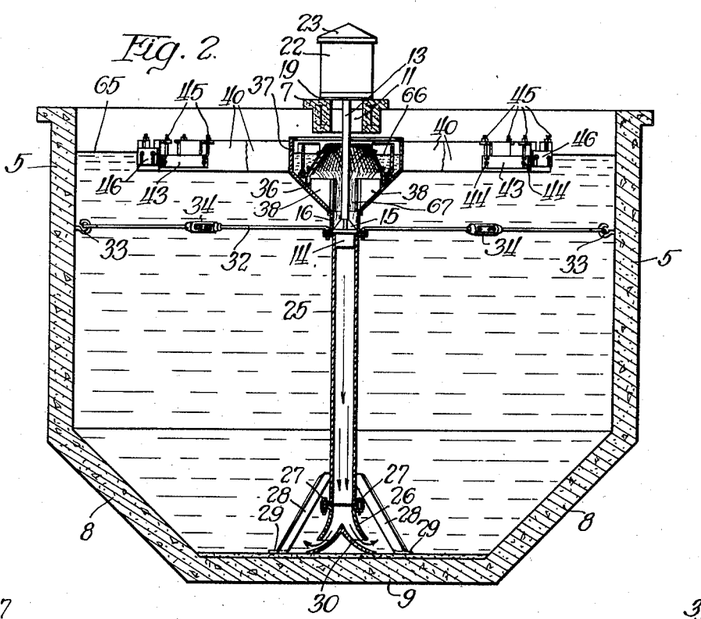
Figure 2 is a sectional end view of an aerating unit.
Figure 13:
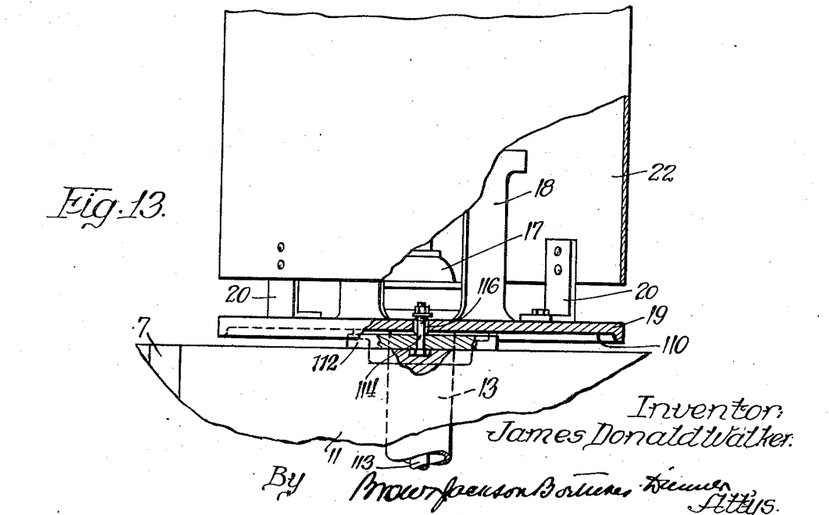
Figure 13 is a vertical elevational view, partly in section, showing specifically the manner of mounting the driving means upon the supporting bridge of the aerating tank.

The bridge member 7, as shown in detail in Figure 2, preferably comprises a reenforced concrete bridge, although it may be formed of any other suitable material, having openings 11 extending therethrough adjacent the central portion of each tank area. These openings are adapted to receive the tubular shielding member 13 of the impeller shaft, the impeller being indicated generally at 14. The tubular member 13 is provided with a supporting portion 15 seating in an annular collar 16 extending thereabout. The impeller shaft is driven by means of a motor, which motor is indicated generally at 17 in Figure 13, and is supported in a motor bracket 18. The motor base plate is shown at 19, and is adapted to receive a plurality of supporting brackets 20, as shown in Figure 13, supporting an annular housing or drum 22 which encloses the motor, and which is provided with a cover or top portion 23 providing a weather-proof housing for the motor.

Extending downwardly from the collar 16 is a tubular conduit 25 which may be of uniform cross-section or may be tapered, as desired, and which is provided at its lower end with a flared end member 26 secured thereto by means of a plurality of flange bolts 27. The member 25 is supported upon the base 9 of the tank by means of a plurality of legs or bracket members 28 having flanged portions 29 bearing against and being grouted into the surface of the base, and which are adapted to support the member 25 in position and to provide for centering the same. A deflector 30, of substantially conical shape, having a concaved lateral area, is centered upon the bottom wall 9 within the bell-shaped member 26, and serves to deflect the liquid travelling downwardly through the conduit 25 in a radial direction along the surface of the base 9 of the tank, the deflector serving to direct the liquid into all portions of the tank area.

The member 25 is located centrally with respect to the tank area which it controls by means of a plurality of anchoring members 32 secured to supporting means 33 carried by the tank and provided with adjusting means 34 for tensioning the same. The members 32 also engage in the collar 16 for centering it with respect to the member 25.

Supported upon the collar 16 is a frusto-conical launder 36 having a cylindrically flanged portion 37 at the large end thereof, and which is centered with respect to the collar 16. The launder 36 is preferably welded, as at 38', or otherwise suitably secured to the collar 16.

Disposed within the frusto-conical portion of the launder are a plurality of baffle members or guide plates, indicated at 38, which are for the purpose of preventing whirling of the liquid being withdrawn from the launder downwardly through tube 25 by means of the impeller 14. Further, these members serve to prevent short circuiting of the impeller 14 since they provide a liquid well thereabove.

Figure 3:
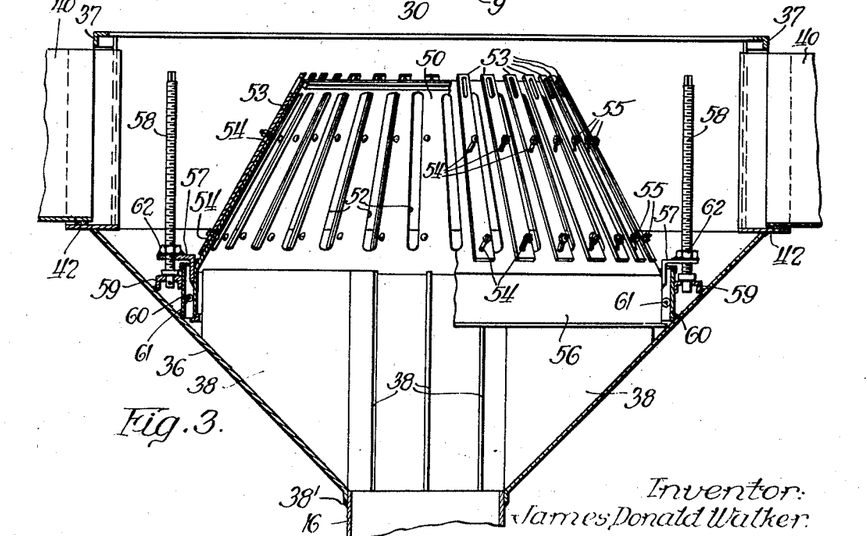
Figure 3 is an enlarged elevational view, partly in section, of the aerating cone structure as embodied in the present invention.

Extending radially into the launder 36 at the cylindrically flanged portion 37 thereof are a plurality of conduit members or troughs 40, which, as shown in detail in Figure 3, are supported in suitable supporting brackets 42 carried within openings formed in the flange 37, the troughs 40 extending slightly inwardly beyond the outer peripheral edge of the brackets 42 and being adjustable with respect thereto.

At the outer end of each of the troughs 40, I provide a pair of opposed weir plates, as shown in detail at 43 in Figure 2, and which are vertically adjustable upon guide pins 44 by means of the adjusting bolts 45. The troughs 40 are also provided across their outer ends with adjustable plates 46, which, however, are ordinarily raised above the level of the plates 43, so that any liquor which will flow into the troughs will flow over the plates 43 and not through the end 46 of the troughs.

The adjustment of the plates 43 determines the quantity of liquor being drawn into the troughs 40 and conducted therefrom into the cylindrical space within the launder 36. The troughs 40 are supported by means of suitable brackets 47 carried by the side walls of the tank 5, and which engage under the outer ends of the troughs 40.

Figure 1:
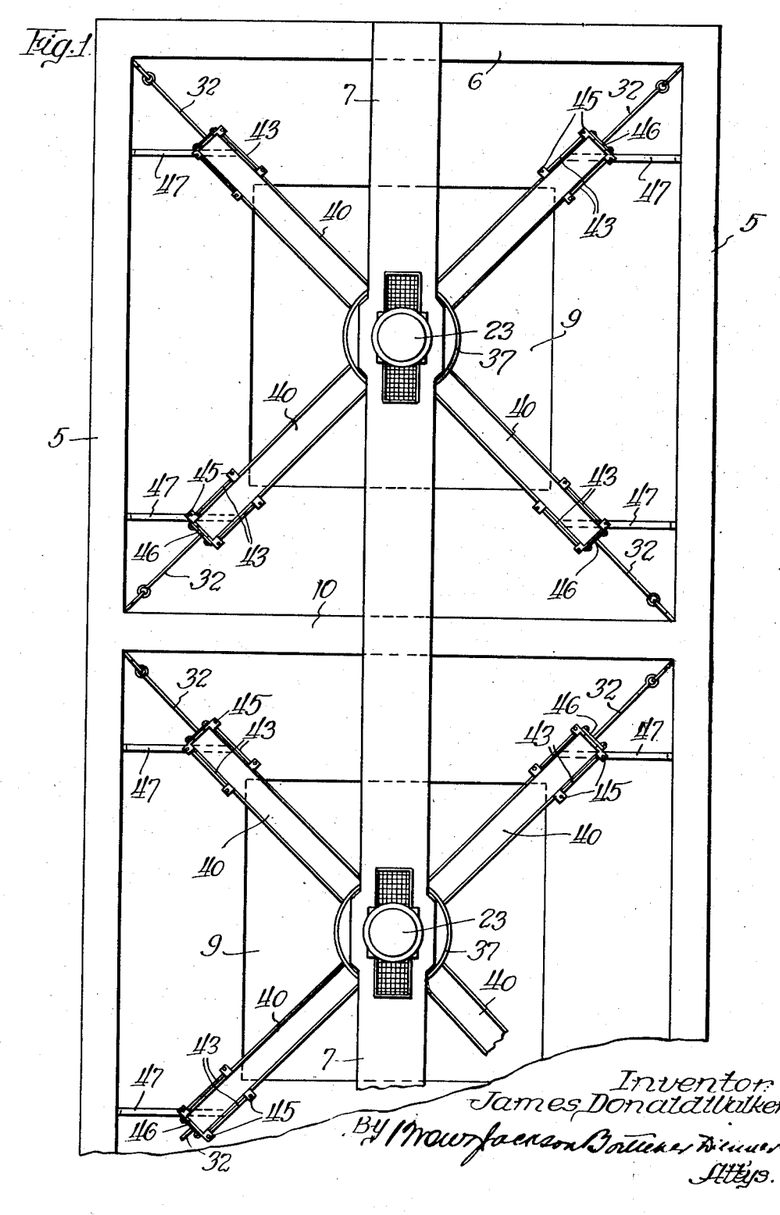
Figure 1 is a top plan view of an aerating tank unit provided with the aerating means of the present invention.

By reason of this arrangement, as shown clearly in Figure 1, the surface liquor in the tank 5 is drawn from various portions of the tank into the troughs 40 over the weir plates 43, and thus an equal withdrawal of surface liquor from all portions of the tank is obtained.

Considering now in detail the aerating cone, the structure shown in Figure 3 provides an inverted type of cone, of frusto-conical section, indicated generally by the reference numeral 50. This cone is provided with a plurality of axially extending slots 52 spaced about the lateral wall of the cone.

Mounted upon suitable bolts carried by the cone 50 and disposed adjacent each of the slots 52 is an adjustable plate member 53 which is provided with angularly extending guide slots 54 receiving the bolts, whereby the bars 53 may be moved with respect to the slots 52 to vary the exposed area thereof. The bars 53 therefor serve to define the effective area of the openings 52 and, when so positioned, nuts 55 are tightened upon the supporting bolts to hold the bars 53 firmly in position with respect to the slots 52. The lower portion of the cone 50 is cylindrically flanged, as shown at 56, and has welded or otherwise suitably secured thereto a plurality of bracket members 57 which have an angle portion extending outwardly at right angles to the axis of the cone 50. The extending ends of the brackets 57 are adapted to receive adjusting standards 58, carried by suitable bracket members 59 supported upon the launder 36. Between the inner plate 60 of the supporting bracket 59 and the outer surface of the flange portion 56 of the cone 50 are provided gasket members 61 for the purpose of accommodating vertical movement of the cone with respect to the plates 60 without allowing leakage of liquid therebetween. This vertical movement is brought about by the threading of the standards 58, so that upon rotation of the standards the brackets 57 are threaded upwardly or downwardly thereon and held in position by locking nuts 62. This provides for adjustment of the vertical height of the cone 50 with respect to the baffle plates 38, and, consequently, with respect to the trough members 40 carried by the launder 36.

Referring now to Figure 2, it will be noted that the liquor in the tank is withdrawn from the surface, indicated at 65, and flows over the weir plates 43 and through the troughs 40 to the launder 36, where it forms a liquid well 66 of a slightly lower height than the surface 65 in the tank. From the well 66 the liquor passes, in a plurality of converging streams, through the slots 52 and downwardly into a second liquid well, indicated at 67, adjacent the upper end of the collar 16 from which the liquid flows downwardly under the action of the impeller 14 through the tube 25 and is expelled through the bell-shape member 26 outwardly radially along the base of the tank, rising upwardly in a more or less uniform manner throughout the tank and through the main body of liquid in the tank to the surface.

The converging streams formed by the liquid falling through the slots 52 serve to incorporate a large quantity of minute air particles into the liquid. This is due to the fact that the skin friction of the individual streams, as they fall towards the well 67, carries along air particles, whereupon, due to the mass and velocity of the streams as they penetrate into the liquid in the well 67, these air particles are carried downwardly below the surface of the liquid in the well 67, and are immediately drawn downwardly by the impeller 14 into the tube 25, and expelled outwardly at the base of the tank. Any relatively large particles of air, which cannot be so incorporated into the liquid, move outwardly from the well 67 and escape through the launder 36.

However, by varying the height of the cone 50 by means of the adjusting standards 58, it is possible to increase or decrease the velocity of the individual streams as they impact against the surface of the liquid in the well 67. This velocity, together with the mass of the individual stream, as determined by the spacing of the bars 53, determines the quantity of air that will be incorporated into the liquid, since the mass and velocity determine the penetration of the streams of liquid into the body of liquid in the well 67 as they drop thereinto, and consequently determine the quantity of air particles carried into the liquid in well 67.

It is thus apparent that the quantity of air particles incorporated in the liquid being circulated in the tank can be varied as desired by varying the area of the slots 52, or by varying the effective drop of the individual streams from the liquid well 66 into the liquid well 67, or by a combination of each of these variations to produce a result not attainable individually by either separate variation.

Figure 4:
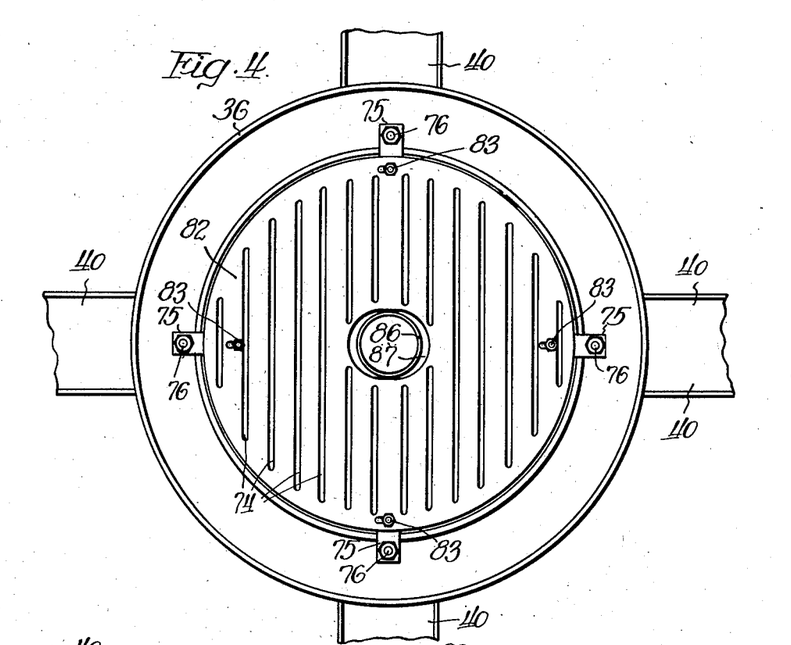
Figure 4 is a plan view of a modified type of aerating cone.
Figure 5:
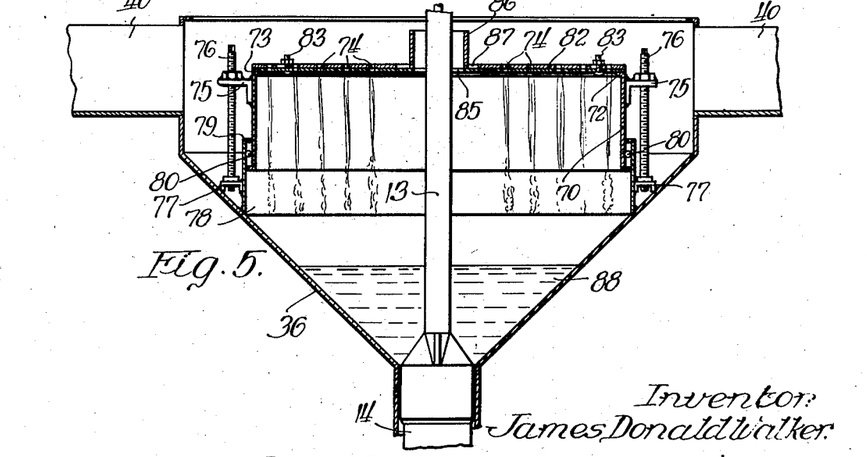
Figure 5 is a vertical sectional view of the cone as shown in Figure 4.

Referring now to Figures 4 and 5, which disclose another modification of the aerating cone, the cone 50 in this modification has been replaced by a cylindrical member 70, having an inturned upper flange 72, upon which is secured a slotted plate 73 having a plurality of slots 74 therein. The member 70 is provided with extending brackets 75 which engage the adjusting standards 76, these standards being supported upon suitable brackets 77 welded to the interior surface of the launder 36. Secured to the brackets 77 and extending vertically within the launder 36 is an annular cylindrical flange member 78 which is provided with an inturned flange portion 79 at the upper end thereof, which fits about the cylindrical member 70 carrying the slotted plate 73. Suitable gasket means or the like, indicated at 80, are provided for preventing the liquid entering through the troughs 40 into the upper portion of the launder 36, as described above, from leaking into the lower portion of the launder 36 without first passing over the slotted plate 73.

Mounted upon the slotted plate 73, and slidable with respect thereto, is a second similarly slotted plate 82 which is adjustably secured by means of bolts 83 to the plate 73, and may be laterally shifted to vary the effective area of the slots 74 in the plate 73.

The plate 73, at its center, is provided with a circular opening 85 which receives the tubular portion 13 of the impeller means, and carries an annular collar member 86 surrounding the same and through which air may be passed into the interior of the member 70. The sliding plate 82 is provided with an enlarged cutout portion 87 which fits around the collar 86 to provide for sliding movement of the plate 82 with respect thereto.

It is apparent in this embodiment of the invention that the liquid will drop in stream form through the openings 74 into the liquid well indicated generally at 88, and the mass of the individual streams, together with the velocity which they attain as they fall from the plate 73 to the surface of the liquid well 88, will determine, to a large extent, the quantity of minute air particles which are incorporated into the liquid in the well 88. This is due to the fact that the outer surfaces of the streams carry along, by skin friction, minute air particles, and the mass and velocity of the streams in striking the well cause the streams to penetrate to a considerable extent thereinto. This penetration effects incorporation of the air particles into the liquid in the well, and the liquid, with these particles incorporated, is immediately drawn downwardly by means of the impeller 14 into the tubular conduit 25. By raising or lowering the member 70, the velocity of the sheets may be varied, since their fall will be determined by the height of the plate 73 above the surface of the liquid in the well 88. By laterally shifting the plate 82, the mass of the individual sheets may be varied, since the effective area of the openings 74 will be changed thereby.

Figure 6:
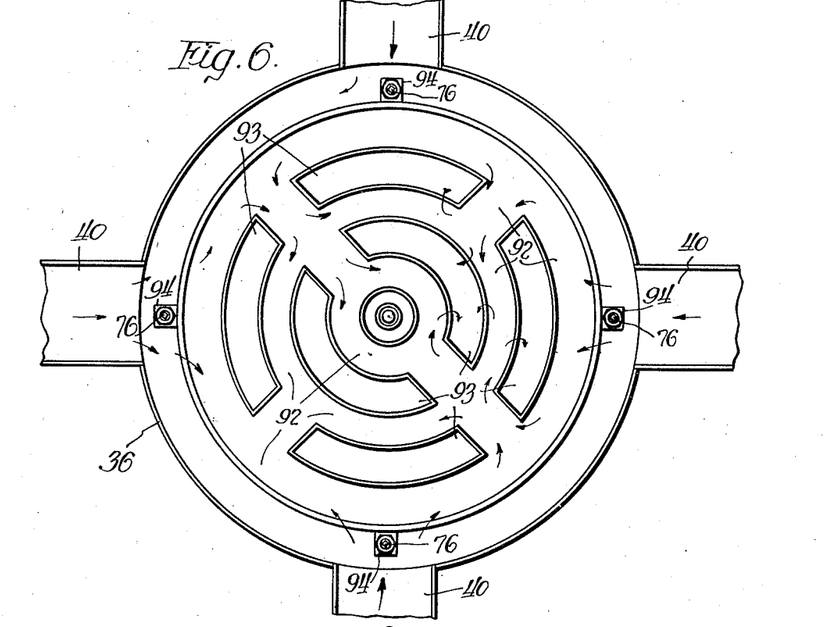
Figure 6 is a plan view of a modified form of aerating cone.
Figure 7:
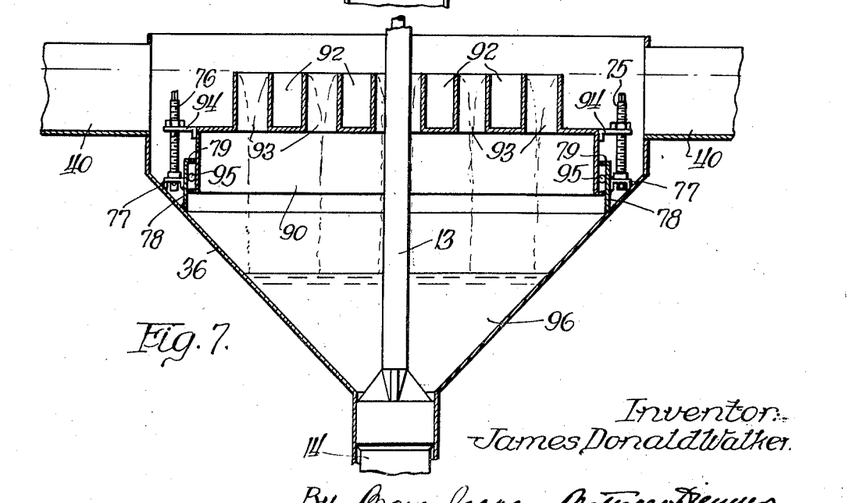
Figure 7 is a vertical sectional view of the aerating cone shown in Figure 6.

In the embodiment of the invention shown in Figures 6 and 7, a still further modified form of aerating cone is provided. The plate 73 of the previous embodiment is replaced by a cylindrical member 90 having a plurality of raised arcuate channels formed therein, as shown at 92. These arcute channels 92 receive liquid from the troughs 40 and, when they are filled, allow the liquid to spill over the defining edges thereof into the openings 93 therebetween. These openings are also arcuate in shape, and the liquid spills over the defining edges in the form of individual streams, similar to liquid flowing over a weir or the like.

The member 90 is provided with brackets 94 which engage adjustable standards similar to those shown in the modification illustrated in Figures 4 and 5. Suitable gasket means 95 are interposed between the plates 78 and the outer peripheral surface of the member 90, and serve to prevent leakage of liquid therethrough. Thus, by adjusting the vertical height of the member 90, the effective head over the defining weir edges of the openings 93 can be varied, and consequently both the mass and the velocity of the liquid streams falling into the liquid well 96 can be varied as desired.

While I have shown the channels 92 as being arcuate in shape, it is to be understood that any desired labyrinth arrangement may be employed, and also, if desired, the openings 93 may be at various heights with respect to the channels or conducting passageways 92, so that certain portions of the liquid will have a different mass and velocity than certain other portions. Also, the area of the openings 93 may be varied, and a plurality of optional arrangements are capable of being employed which embody the features described in connection with this modification.

By the variation of the mass and the velocity of the streams falling into the well 96, the control of aeration can be effected in the same manner as previously described.

Figures 8, 10:
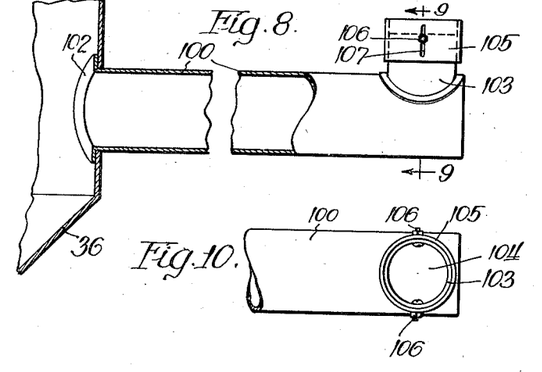
Figure 8 is an elevational view, partly in section, of a modified form of conduit structure.
Figure 10 is a plan view of a portion of the conduit structure shown in Figure 8.
Figure 9:
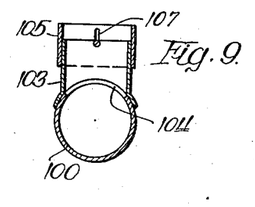
Figure 9 is a sectional view taken substantially on the line 9—9 of Figure 8.

Considering now Figures 8, 9 and 10 of the present invention, in this embodiment I have illustrated a modified form of conducting trough to replace the trough members 40 if it is desired to place the trough members below the surface of the tank in order to improve the appearance thereof, or for other reasons.

In this embodiment, the launder 36 is provided with circular openings spaced below the level of liquid in the aeration tank, which are adapted to receive conduit members 100, the conduit members being either circular in section, or of any other desired shape. I have, optionally, illustrated them as being circular, and provided with flanged end portions 102 engaging the inner surface of the launder 36 to secure the conduits in position. At their outer ends, the conduits 100 are provided with a saddle-shaped vertically extending connection 103 which communicates with an opening 104 formed in the ends of the conduits 100 and which is adapted to receive, in telescoping relation, an adjustable weir member 105 having sliding engagement upon a pin 106, the weir 105 being provided with suitable slots 107 for adjustment vertically with respect to the member 103. This provides for varying the effective head of liquid spilling over the upper defining edges of the member 105 and into the conduit 100 through the opening 104. The member 105 thus takes the place of the adjustable weir plates 43 of the previous embodiment, and achieves the same result, namely, the drawing in of surface liquor from a given area in the tank so that distributed flow and circulation of liquid in the tank is effected.

Figure 11:
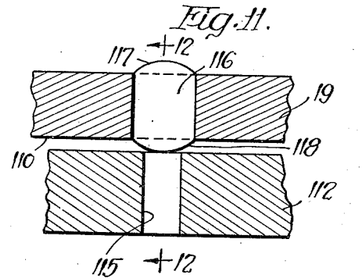
Figure 11 is a vertical sectional view of the mounting bracket for the driving means.
Figure 12:
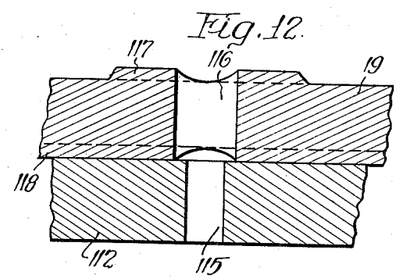
Figure 12 is a vertical sectional view taken substantially on the line 12—12 of Figure 11.

Considering now in detail the structure shown in Figures 11, 12 and 13, it will be noted that the supporting plate 19 is recessed, as indicated at 110, and fits over a suitable supporting plate 112 carried upon the upper surface of the bridge 7. The plate 112 is preferably grouted or otherwise suitably set into the concrete bridge 7, and is fixed in position over the opening 11 through which the tubular member 13 for the shaft 113 of the impeller is extended.

Suitable bolt members, indicated at 114, are set in the concrete bridge 7, and extend upwardly through suitable openings 115, as shown in Figures 11 and 12, disposed in diametrically opposed peripheral portions of the plate 112, to a position considerably above the upper surface of the plate 112. These bolts are adapted to be received within enlarged openings 116 formed in the plate 19 which supports the motor 17, and adjacent each of the openings the plate 19 is provided with raised arcuately curved boss portions 117 and 118.

These bosses 117 and 118 provide for rocking movement of the plate 19 with respect to the plate 112. Thus, upon longitudinal expansion or contraction of the bridge member 7, due to temperature changes adjacent the tank, the bridge 7 tends to move either to the right or left. Since the bolts 114 and the plate 112 are carried by the bridge, they also tend to move in the same manner. However, by the provision of the rocking bosses 117 and 118, and the enlarged bolt openings 116, any slight amount of movement of the plate 112 and bolts 114 will not throw the shaft 113 out of vertical alignment, since the bosses and the enlarged bolt openings will accommodate variations in movement between plate 19 and plate 112 due to the shifting of the bridge under temperature changes.

It is thus apparent that I have provided a structure wherein distributed and equalized upward flow of liquid concentrated with minute particles of air will be effected, and whereby surface liquor is withdrawn downwardly and air particles incorporated therein without agitating the surface of liquid in the tank, the aeration being controlled to vary the quantity of air particles incorporated into the liquid in accordance with the aeration desired within the tank.

Further, the structural features of the present aeration apparatus lend themselves readily to adaptation in practically all types of aerating tanks, and, with the adjustable features heretofore described, provide for an accurate control of aeration within the tank and under the control of a motor driven mechanism.

In addition, the structure provides for a concealed aerating system to enhance the appearance of the aeration tank and to prevent any localized surface disturbances. Further, I have accommodated the structure to take care of changes or shifting of the mechanism due to temperature variations.

Insofar as the principles of the present invention are applicable to other constructions embodying the same inventive concepts, I do not intend to limit my invention to the exact structure illustrated and described, but only as defined by the scope and spirit of the appended claims.

I claim:

1. The method of aerating sewage in an aeration tank which comprises conducting surface liquor from selected portions of the surface of liquor in said tank to a central restricted portion in said tank open to atmosphere, drawing said liquor downwardly through said tank from said restricted portion and simultaneously incorporating minute particles of air therein, and discharging said liquor radially outwardly along the bottom of said tank.

2. The method of aerating sewage in an aeration tank which comprises conducting surface liquor from a plurality of selected portions of the surface of liquor in said tank to a central restricted area in said tank, separating said liquor into a plurality of individual streams discharging into liquor in a liquor well at a lower depth, controlling the depth of penetration of said stream into said well liquor, drawing liquor from said well downwardly through said tank and discharging said liquor radially outwardly along the bottom of said tank.

3. The method of aerating sewage in an aeration tank which comprises conducting surface liquor simultaneously from a plurality of selected spaced surface areas to a central restricted area, discharging said liquor in a plurality of individual streams into a liquor well, drawing said liquor from said well downwardly centrally of said tank, and discharging said liquor radially outwardly along the bottom of said tank.

4. The method of aerating sewage in an aeration tank having a centrally disposed aeration apparatus, which comprises conducting surface liquor from selected radially spaced areas of surface of the liquor in said tank to a restricted central portion of said tank, discharging said liquor downwardly into a liquor well and simultaneously incorporating air particles thereinto, controlling the depth of penetration of said discharged liquor into the liquor in said well, drawing said liquor from said well downwardly through said tank, and discharging said liquor outwardly along the bottom of said tank.

5. The method of aerating sewage in an aeration tank which comprises drawing off surface liquor from a plurality of sources in said tank, conducting said drawn-off liquor through the liquor in said tank to a common receiving point, discharging said drawn-off liquor downwardly into a liquor well and simultaneously incorporating minute air particles into the liquor in said well, drawing said liquor from said well downwardly to the bottom of said tank, and discharging said liquor outwardly along the bottom of said tank.

6. The method of aerating sewage in an aeration tank which comprises drawing individual portions of surface liquor from selected portions in said tank to a restricted portion thereof open to atmosphere at the top thereof, discharging said withdrawn liquor downwardly into a liquor well and simultaneously incorporating minute particles of air into the liquor in said well, controlling the penetration of said liquor into the liquor in said well to control the quantity of air particles incorporated into said liquor, drawing said liquor downwardly from said well toward the bottom of said tank, and discharging said liquor along the bottom of said tank.

7. The method of controlling aeration of sewage in an aeration tank which comprises conducting surface liquor from a plurality of selected portions of said tank into a launder, separating said liquor into a plurality of independent streams, discharging said streams downwardly into a liquor well, carrying minute air particles into the liquor in said well along with said streams, varying the mass and velocity of said streams in accordance with the amount of aeration desired, drawing liquor from said well downwardly through said tank, and discharging said liquor outwardly along the bottom of said tank.

8. The method of controlling aeration of sewage in an aeration tank which comprises conducting surface liquor from selected portions of said tank into a launder, separating said liquor into a plurality of independent streams, discharging said streams downwardly into a liquor well, carrying minute air particles into the liquor in said well along with said streams, varying the penetration of the individual streams into the liquor in said well in accordance with the amount of aeration desired, drawing liquor from said well downwardly through said tank, and discharging said liquor outwardly along the bottom of said tank.

9. In an aeration tank of the class described, the method of aerating liquor in said tank which comprises drawing surface liquor from several selected areas in said tank to a central launder, passing said liquor from said launder downwardly into a liquor well in a plurality of individual streams, simultaneously forcing minute air particles into the liquor in said well by the penetration of said streams thereinto, controlling said penetration in accordance with the aeration desired, and distributing the liquor from said well outwardly along the bottom of said tank.

10. Aerating apparatus for an aeration tank containing sewage liquor comprising a conduit extending downwardly in said tank to a point adjacent the bottom thereof, an impeller in said conduit intermediate its ends, a liquor well mounted upon said conduit and opening thereinto, a launder open to atmosphere surrounding said well and spaced therefrom, means for conducting surface liquor from a plurality of selected surface areas in said tank to said launder, and aerating means between said launder and said well and above said impeller for separating said liquor into a plurality of individual streams in contact with atmosphere discharging into said well.

11. Aerating apparatus for an aeration tank containing sewage liquor comprising a conduit extending downwardly in said tank to a point adjacent the bottom thereof, an impeller in said conduit, a liquor well mounted upon said conduit above said impeller and opening thereinto, a launder surrounding said well and spaced therefrom, means for conducting surface liquor from various spaced surface portions of said tank through the intermediate portions thereof to said launder, aerating means between said launder and said well for separating said liquor into a plurality of individual streams discharging into said well, and means carried by said aerating means for varying the mass of the individual streams passing into said well.

12. Aerating apparatus for an aeration tank containing sewage liquor comprising a conduit extending downwardly in said tank to a point adjacent the bottom thereof, an impeller in said conduit, a liquor well mounted upon said conduit above said impeller and opening thereinto, a launder open to atmosphere at the top thereof surrounding said well and spaced therefrom, trough means for conducting surface liquor from the lateral extremities thereof disposed in various portions of said tank laterally into said launder, aerating means between said launder and said well for separating said liquor into a plurality of individual streams discharging into said well, and means for adjusting the vertical height of said aerating means above said well.

13. Aerating apparatus for use in an aeration tank and adapted to be interposed between a downwardly extending conduit and a launder receiving surface liquor, comprising a liquor well disposed within said launder and communicating with said conduit, means open to atmosphere and disposed between said well and said launder for dividing said surface liquor from said launder into a plurality of individual streams in contact with atmosphere as it passes into said well, and means for vertically adjusting said last-named means with respect to said well.

14. An aerating cone for use in aerating apparatus of the class described comprising a frusto-conical shell member having its larger end extending downwardly and provided with a cylindrically flanged portion, said member being provided with a plurality of spaced openings in its lateral surface, means carried by said member for controlling the size and number of said openings, and independent means carried by said flanged portion for raising and lowering said member with respect to said aerating apparatus.

15. Aerating means for aerating apparatus of the class described including a frusto-conical liquor well having at its larger end a cylindrical launder, said aerating means comprising a first cylindrical flange member secured in said well, an inverted cup-shaped member having a cylindrical portion telescopically engaging in said flange member, the base of said cup-shaped member being provided with a plurality of openings, means for varying the size of said openings, and means for adjusting said cup-shaped member vertically with respect to said well.

16. Aerating means for aerating apparatus of the class described comprising a circular launder, a frusto-conical liquor well depending therefrom, and a vertically adjustable aerating member disposed in said well and providing for flow of liquor from said launder therethrough into said well, said member having a plurality of arcuate channels formed therein and providing therebetween openings for admission of said liquor from said launder into said well.

17. In aerating apparatus of the class described for an aeration tank including a central aerating cone, a launder surrounding said cone, and a plurality of conduit members communicating with said launder and extending outwardly therefrom, said members having adjustable port means at their outer ends for drawing surface liquor thereinto from the centers of a plurality of predetermined areas of surface in said tank.

18. In aerating apparatus of the class described including a central aerating cone, a launder surrounding said cone and open to atmosphere at its top, and a plurality of radially spaced troughs extending laterally into said launder, said troughs having adjustable weir openings at their outer ends providing for flow of surface liquor thereinto at the outer ends of said troughs.

19. In an aeration tank having a central horizontal bridge extending thereacross, an aeration unit for said tank comprising a central vertically extending conduit, aerating means mounted at the upper end thereof, radially extending conduit means projecting outwardly from said aerating means for conveying surface liquor from spaced areas of surface in said tank to said aerating means, an impeller in said conduit below said aerating means for drawing said surface liquor downwardly therethrough, and driving means for said impeller supported on said bridge.

20. In an aeration tank having liquor therein, aerating means for said liquor disposed substantially centrally of said tank and open to atmosphere at the top thereof, means for conducting said liquor from the surface of a predetermined area of said tank at a point spaced from the aerating means to said aerating means, and means in said tank below said aerating means for drawing said liquor and air particles entrained therein downwardly through said tank.

21. The method of supplying surface liquor from an aeration tank to aerating means in said tank, which comprises withdrawing liquor from the centers of a plurality of predetermined areas of the surface of liquor spaced from the aerating means in said tank, and conducting said liquor from all of said centers through the liquor in said tank to said aerating means.

22. Aerating apparatus comprising a launder having laterally extending means communicating with selected spaced areas of the surface of liquor in an aeration tank and open to atmosphere, a frusto-conical closure member depending therefrom and having a liquor well at its small end, a conduit leading downwardly from said well, and means controlling communication between said launder and said well comprising a member vertically adjustable with respect to the liquor in said well and having port means for dividing liquor from said launder into a plurality of individual streams prior to entrance into said well, said last-named member allowing said streams to be in contact with atmosphere as they pass therethrough and fall into said well.

23. Aerating apparatus of the class described comprising a launder having a depending frusto-conical portion, the small end of said portion defining a liquor well, a vertical baffle member extending upwardly from the interior of said frusto-conical portion intermediate the launder and the well, an aerating member mounted for vertical movement with respect to said baffle member, means in said member for passing liquor from said launder into said well, said means dividing said liquor into a plurality of individual streams in contact with the atmosphere as said liquor passes therethrough into said well, and means for adjusting said aerating member vertically to vary the depth of penetration of said streams into the liquor in said well.

JAMES DONALD WALKER.